US010867119B1

(12) United States Patent
Karppanen et al.

(10) Patent No.: US 10,867,119 B1
(45) Date of Patent: Dec. 15, 2020

(54) THUMBNAIL IMAGE GENERATION

(71) Applicant: Amazon Technologies, Inc., Seattle, WA (US)

(72) Inventors: Jari Juhani Karppanen, Bellevue, WA (US); Amey Shreekant Jahagirdar, Seattle, WA (US); Kartikey Bhatt, Sammamish, WA (US); Sunitha Kalkunte Srivatsa, Seattle, WA (US); Serghei Drozdov, Seattle, WA (US); Jae Yoon Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/084,423

(22) Filed: Mar. 29, 2016

(51) Int. Cl.
*G06F 40/14* (2020.01)
*G06K 9/00* (2006.01)
*G06F 16/957* (2019.01)
*G06F 16/2457* (2019.01)
*G06F 40/20* (2020.01)
*G06F 40/103* (2020.01)
*G06F 40/146* (2020.01)
*G06F 40/163* (2020.01)
*G06F 40/166* (2020.01)

(52) U.S. Cl.
CPC ........ *G06F 40/14* (2020.01); *G06F 16/24578* (2019.01); *G06F 16/9577* (2019.01); *G06F 40/103* (2020.01); *G06F 40/146* (2020.01); *G06F 40/163* (2020.01); *G06F 40/166* (2020.01); *G06F 40/20* (2020.01); *G06K 9/00228* (2013.01); *G06K 9/00288* (2013.01)

(58) Field of Classification Search
CPC ............... G06F 17/2247; G06F 17/211; G06F 17/2252; G06F 17/2294; G06F 17/24; G06F 17/27; G06F 17/3053; G06F 17/30905; G06F 40/14; G06F 40/20; G06F 40/103; G06F 40/146; G06F 40/163; G06F 40/166; G06F 16/9577; G06F 16/24578; G06K 9/00228; G06K 9/00288
USPC ....................................................... 715/234
See application file for complete search history.

(56) References Cited

U.S. PATENT DOCUMENTS 6,356,908 B1 * 3/2002 Brown .............. G06F 17/30899
6,457,030 B1 * 9/2002 Adams ................ G06F 16/9577
715/239
6,665,838 B1 * 12/2003 Brown .............. G06F 17/30864
707/E17.111

(Continued)

OTHER PUBLICATIONS

Web Resources Depot, "10 Free Website Thumbnail Generation Service", published on Nov. 4, 2008, by Web Resources Depot at https://webresourcesdepot.com/10-free-website-thumbnail-generation-services/, pp. 1-4.*

*Primary Examiner* — Wilson W Tsui
(74) *Attorney, Agent, or Firm* — Thorpe North & Western, LLP.

(57) ABSTRACT

Technology for generating thumbnail images is provided. In one example, a thumbnail image generation method may include receiving a request to generate a thumbnail image of an electronic page. The electronic page may be analyzed to identify content features of the electronic page. A determination of changes to make to a copy of the electronic page may be made based on the content features to form a modified electronic page. The thumbnail image for the electronic page may be generated using at least a portion of the modified electronic page.

20 Claims, 13 Drawing Sheets

(56) References Cited

U.S. PATENT DOCUMENTS

| | | | | |
|---|---|---|---|---|
| 6,665,841 B1* | 12/2003 | Mahoney | G06F 16/5838 | 715/204 |
| 7,069,506 B2* | 6/2006 | Rosenholtz | G06F 17/30899 | 707/E17.119 |
| 7,849,093 B2* | 12/2010 | Farago | G06F 16/435 | 707/755 |
| 8,205,172 B2* | 6/2012 | Wong | G06F 17/30884 | 715/704 |
| 8,498,990 B2* | 7/2013 | Heber | G06Q 10/00 | 707/748 |
| 8,700,543 B2* | 4/2014 | Glickman | G06Q 30/0201 | 706/12 |
| 8,812,969 B2* | 8/2014 | Hart | G06F 17/30058 | 715/730 |
| 9,270,701 B1* | 2/2016 | Lamb | H04L 63/20 | |
| 10,417,316 B2* | 9/2019 | Leventhal | G06F 17/2229 | |
| 2007/0038525 A1* | 2/2007 | Waldvogel | G06Q 30/02 | 705/27.1 |
| 2008/0319844 A1* | 12/2008 | Hua | G06Q 30/02 | 705/14.73 |
| 2010/0122216 A1* | 5/2010 | Song | G06K 15/02 | 715/838 |
| 2010/0162103 A1* | 6/2010 | Eom | G06F 3/1253 | 715/255 |
| 2013/0339840 A1* | 12/2013 | Jain | G06F 17/2247 | 715/234 |
| 2015/0089402 A1* | 3/2015 | Rong | G06Q 50/01 | 715/760 |
| 2015/0213305 A1* | 7/2015 | Sundstrom | G06K 9/00281 | 382/118 |
| 2015/0254713 A1* | 9/2015 | Brewer | G06Q 30/0256 | 705/14.54 |
| 2015/0317406 A1* | 11/2015 | Bort | G06F 8/38 | 715/234 |
| 2016/0132931 A1* | 5/2016 | Levinson | G06Q 30/0263 | 705/14.45 |
| 2016/0171106 A1* | 6/2016 | Song | G06F 17/30867 | 707/709 |
| 2016/0275051 A1* | 9/2016 | Bruce | G06F 17/211 | |
| 2017/0109785 A1* | 4/2017 | Vidra | G06Q 30/0256 | |

* cited by examiner

210

Social Sharing

215

Frédéric Louis Godet
*Scholar, Author, Theologian*

Posts 225

220
Friend List:

E.W. Shalders

M. D. Cusin

John Hall, D.D.

I.K. Funk

Just finished writing my latest commentary. Check it out on my blog!

So excited! I was appointed professor at Neuchâtel today!

230

*Social Sharing*

Frédéric Louis Godet
*Scholar, Author, Theologian*

310

335
*Godet Blog*

Scholarly commentary of the 19th Century

330

Search 🔍

350

315

Lorem ipsum dolor sit amet, consectetur adipiscing elit. Suspendisse eget viverra mauris. Praesent consequat et velit at finibus. Pellentesque sed arcu eleifend, dapibus risus in, imperdiet nisl. Aliquam ultrices elit at posuere posuere. Sed eget pellentesque libero, vitae pharetra magna. Donec dictum dolor nisl, ut euismod massa malesuada eu. Quisque vitae neque sem. Proin aliquam elementum imperdiet. In sed tincidunt augue, quis consectetur ante. Integer congue, urna eu tristique fermentum, purus turpis finibus magna, eu imperdiet dolor risus nec ipsum. Vestibulum ante ipsum primis in faucibus orci luctus et ultrices posuere cubilia Curae; Nulla porttitor ex lacus, vitae maximus dolor ultrices ut. Curabitur lobortis arcu neque, vitae dictum est maximus non. Phasellus vel justo libero. Cras eleifend ipsum et mi elementum porta. Cras non scelerisque nulla.

*Getaway Today!!*

320

Integer tempor lectus ut ex rutrum aliquam. Sed nec odio fringilla, lacinia mi pretium, tincidunt nisi. Nulla pulvinar facilisis nunc, at placerat dolor auctor sit amet. Ut bibendum nibh nec consequat viverra. Nulla finibus consectetur mauris non iaculis. In non dui blandit, maximus lorem at, gravida velit. Vivamus dignissim tristique ligula in ultrices. Aliquam tempus arcu vitae arcu posuere, eu ultrices orci imperdiet.

*Click here to view archives* ⁀ 325

*Travel in Style!!*

We have the best deals on airfare and car rental to get you where you want to go. Explore our site to learn more.

Schedule a Cruise

Select a departure location

Select a destination

Select desired travel dates

415

Not sure whether to travel with us?

Read a review by one of our recent guests from his recent visit to the Eiffel Tower...

THUMBNAIL IMAGE GENERATION

BACKGROUND

From services of the Internet, users may retrieve or download data for internet network pages and display the data that includes information presented as: text in various fonts, graphics, images, dynamic controls, dynamic advertisements, and the like having an appearance intended by the publisher. As the information revolution has exploded, more and more information is available through the internet. However, finding particular pieces of information out of the millions of "web sites" available can be daunting.

Once a user has discovered a particular page, website or other piece of information, enabling the user to identify and revisit that piece of information may be useful. For example, a user may wish to bookmark the page and store the Internet address together with additional identifying information such as a name of the page, a description of the page, and so forth. In addition to bookmarking functionality, many web browsers also maintain a history of pages visited. The history may include various identifying pieces of information about the page which may be similar to the identifying information included in a bookmark. The inclusion of such information in the history or the bookmark may enable the user to recognize and identify the page from among other bookmarked or visited pages.

Some web browsers may include a thumbnail image of the bookmarked or visited pages to further enhance ease of recognition of the pages. The thumbnail images may represent the appearance of a portion of the pages. As mobile devices with small, touch interfaces become more prevalent, thumbnail images provide an easier touch interface because of the larger and more touchable display real estate occupied by an image rather than text. Thumbnail images may have any number of other uses as well. For example, search engines cataloging pages may include thumbnail image of the page. However, the way thumbnail images are created may not result in a useful thumbnail image.

BRIEF DESCRIPTION OF THE DRAWINGS

FIGS. 3A-3D illustrate a page with dynamic content and other content features and the filtering of the page for generating thumbnail image variations in accordance with examples of the present technology.

DETAILED DESCRIPTION

Figure 1A:
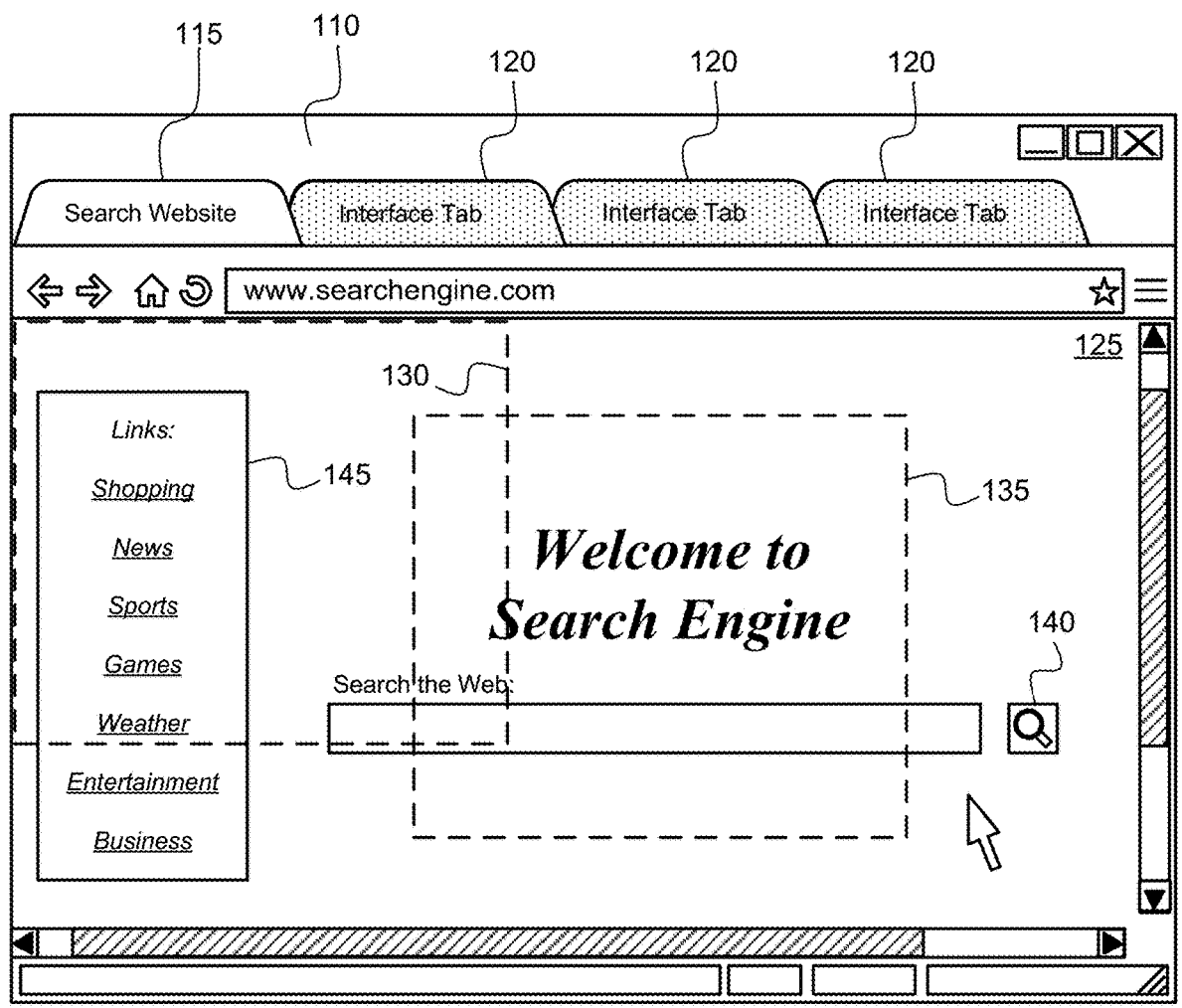
FIGS. 1A-1D illustrate a search page and thumbnail variations for the search page in accordance with examples of the present technology.

A technology for generating thumbnail images using content features of a page is provided. In one example, a thumbnail image generation method may include receiving a request to generate a thumbnail image of an electronic page. The electronic page may be analyzed to identify content features of the electronic page in order to generate a thumbnail image which is intended to be visually well-representative of the electronic page. Content features may include, for example, images, text, colors, shapes, etc. and may comprise the content of the electronic page. Modifications or changes to a copy of the electronic page may be determined based on the content features for a modified electronic page. For example, some content features may be removed, replaced, resized, repositioned, or excluded from the thumbnail image area of the electronic page. The thumbnail image for the electronic page may be generated using at least a portion of the modified electronic page.

In another example, a thumbnail image generation method may include receiving a request to generate a thumbnail image for an electronic page and analyzing the electronic page to identify content features of the electronic page. The analysis may include looking for markup tags, instructions, or notices from the publisher for identifying one or more portions of the electronic page to include in the thumbnail image, identifying static and dynamic content of the electronic page, identifying blank spaces on the electronic page, etc. The method may further include determining which thumbnail-relevant content features of the electronic page to emphasize and which less-relevant content features of the electronic page to de-emphasize. For example, the various content features of the electronic page may be scored and ranked, where low-scoring or low-ranking content is determined to be less suitable for the thumbnail image than higher-scoring or low-ranking content. Modifications to a copy of the electronic page may be determined in order to generate a modified electronic page emphasizing the thumbnail-relevant content features and de-emphasizing the less-relevant content features. The thumbnail image for the electronic page may be generated using at least a portion of the modified electronic page.

Prior technologies have created thumbnail images in a rigid manner. For example, a thumbnail image of a page may be created starting at the top left corner of a page at coordinate (0, 0). An image from which the thumbnail is generated may be captured which occupies a set number of vertically and horizontally arranged pixels from the starting coordinate, such as 100 pixels for example. A 100×100 pixel image may thus captured from (0, 0) to (100, 100) for use as the thumbnail image. In one example, the captured image may be reduced in size and/or compressed to a size more suitable for a thumbnail image for the specific application (e.g., 50×50 pixels). In another example, rather than a set number of pixels, a percentage of the page extending vertically and extending horizontally from the top left corner may be captured as the thumbnail image. The use of a predetermined, arbitrary location (e.g., top left corner) for capturing the thumbnail of a page may lead to thumbnails which may not be representative of the page or the page content, and may have limited value to a user viewing the thumbnail when determining whether to visit a page. Some prior technologies have created thumbnail images from a full page rather than a portion of the page. However, when a thumbnail image is captured, the content of the page may be significantly reduced in size or compressed such that discerning what content is represented in the image is difficult or the image includes a substantial amount of content or information that does not facilitate easy recognition of the page from the thumbnail image. Text may become unreadable, images may become unrecognizable, etc., particularly when the thumbnail image is viewed on a small display device such as a mobile phone or tablet computing device.

The present technology more accurately determines what a thumbnail image, or simply "thumbnail", for an electronic page (e.g., webpage), or simply "page", is to look like. The present technology may use metrics to determine the structure, appearance, organization, content, etc. of thumbnail. An example application of the present technology is with the use of a multiple data source application, such as an internet browser application. A browser may, for example, create and use thumbnails for websites or pages of websites for various purposes. The browser may generate thumbnails for pages when a user bookmarks the page. The bookmark thumbnails may appear in a list from which the user may view the thumbnails and select a desired page to visit. As another browser-based example, thumbnails may be used to depict recently visited pages, desktop shortcuts to pages, etc. Other examples for uses of page thumbnails may include archival operations, presentation applications, website preview applications, and other applications.

Referring to FIG. 1A, a multiple data source application window 110 is illustrated with a number of interface tabs 115, 120 open for viewing pages. The active tab 115 is open to a search engine page 125 which allows users to search the internet. The search engine page 125 includes some example links 145 to popular topics a user may be interested in viewing.

Figure 1B:
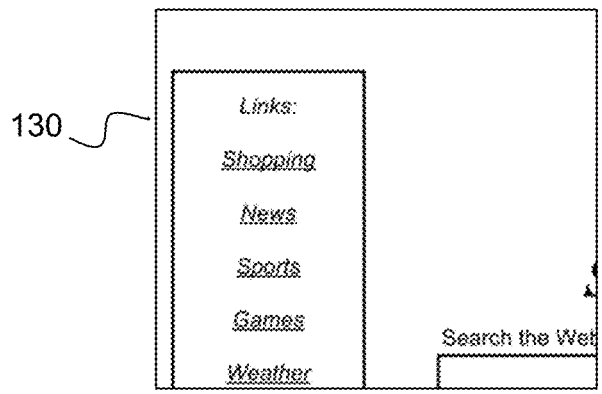
Figure 1C:

The search engine page 125 is overlaid with two boxes illustrating example regions 130, 135 of the page from which to capture a thumbnail. The first region 130 starts arbitrarily at the top left corner as has been done with previous technologies. The bounds of the region 130 to be used as the thumbnail image are defined by the dotted line surrounding the first region 130. FIG. 1B illustrates the result of a thumbnail image created using this region 130. The result is a lot of white space and small text links that may provide little value to a user attempting to determine the nature of the page represented by the thumbnail. The second region 135 in FIG. 1A is the same size as the first region 130 but is more intelligently positioned to capture a portion of the page 125 which is more identifiable. FIG. 1C illustrates the result of a thumbnail image created using the positioning of the second region 135. Large text including the name of the page or service is provided and is substantially centered in the image. The image further includes a query field to use for searching, which is another main feature of the search engine page 125 of FIG. 1A.

Figure 1D:
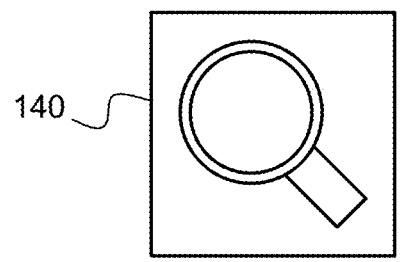

While the thumbnail of FIG. 1C may be more useful in identifying the page 125 of FIG. 1A than the thumbnail of FIG. 1B, there may be reasons why a thumbnail such as shown in FIG. 1C has limited value. For example, some pages may not include large text, or the size of the thumbnail may be small such that even originally large text is small and difficult to read in a thumbnail image. A portion of the page may thus be selected which is representative of the page even with a more limited size, resolution, etc. FIG. 1D illustrates an example thumbnail created from the search query magnifying glass icon 140 of FIG. 1A. The image 140 in FIG. 1D may scale better to different sizes and still accurately represent the content of the page 125 in the thumbnail.

The present technology may be configured to identify content features of the page which are useful or relevant for creating a thumbnail image and content features which are less useful or relevant. For example, the content features may be scored and ranked against one another to determine which content features to include in the thumbnail image, and optionally which content features to exclude from the thumbnail image. Additional specific details regarding this functionality will be made apparent.

In one example, a height of a thumbnail image to be created may be set as a predefined percentage of a height of a page or optionally as a height of a portion of the page visible on an individual computing device. Because different computing hardware may be capable of displaying smaller or greater areas of a web page at a time due to graphical processing capabilities, display capabilities, etc., tailoring the height of the thumbnail based on what is visible to the user upon loading the page may make the thumbnail image more recognizable to a user of the computing device. However, capturing a thumbnail image as a percentage of the entire page height may also be useful for consistency across devices, for better representation of content features which may not be fully visible on computing devices with poor resolution or display capabilities, and so forth. In choosing the percentage of the page height selecting the first x % of the height may not be desirable, such as illustrated in the example of FIG. 1B. Also, some pages include a large amount of dynamic content. For example, if a thumbnail image is created from dynamic text-heavy sites such as www.reddit.com or news.ycombinator.com, the content features in the thumbnail may be difficult to identify because the text is unrecognizable in the thumbnails. Similarly, for sites like Amazon.com which may host half-page dynamic graphic ads or even video ads, determining when to capture the thumbnail image may be challenging. Dynamic ads may rotate every predefined number of seconds and therefore may not have an identity that is easily recognizable by a user in a thumbnail image as being associated with the site. The present technology provides solutions and approaches for intelligent thumbnail selection and generation which address these issues.

Figure 2A:
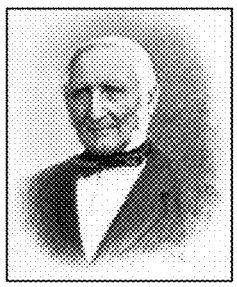
FIGS. 2A-2B illustrate a social media page and a thumbnail generated based on publisher instructions included in the social media page in accordance with an example of the present technology.
Figure 2B:

With reference to FIGS. 2A-2B, a publisher of a page 210 may provide hints or instructions for use by a browser or other application in generating the thumbnail image. A publisher may be knowledgeable and well-suited for determining which content features of the page best represent the essence, content or theme of a page or site. A publisher may follow predefined standards or rules for defining which content features of the page 210 to include in a thumbnail image. For example, the publisher may use a pre-defined syntax which is understood by the browser to define which portions of the page to include in the thumbnail image. Example syntax a publisher may use and which a browser may be configured to recognize is as follows.

<div class="thumbnail_generation_wrapper"><!--Main content of the page--></div>

The browser may read this syntax and generate a screenshot of the area of the page included in the section of the page defined by the <div></div> tags including the "thumbnail_generation_wrapper" class identifier. (X,Y) coordinates for the thumbnail image may be determined based on the position of the start of this div wrapper extending to the end of the div wrapper.

In FIG. 2A, an example of a social media page 210 is illustrated. The page 210 includes a header section 215 identifying the social media site and page information about a subject of the page. These content features may be relatively static. Friends list 220 and posts 225 sections of the page 210 may include more dynamic information that is updated frequently and may be minimally representative of the site or the subject of the page 210 for identification purposes in a thumbnail image. The friends list 220 and posts 225 sections of the page 210 are illustrated with a background pattern to visually differentiate the static header 215 from the dynamic content of the friends list 220 and posts 225. Basic structure of underlying code for such a page 210 may be as follows (significantly simplified for explanation purposes).

```
<HTML>
  <Body>
    <div                                       id="header"
      class="thumbnail_generation_wrapper"></div>
    <div id="friend list"></div>
    <div id="posts"></div>
  </Body>
</HTML>
```

The "thumbnail_generation_wrapper" class identifier is only included in the "header" section and will thus be the only portion of the page used to generate a thumbnail image. The "friends_list" and "posts" sections do not include the appropriate class identifier and are not included in the thumbnail image. Content features between the opening and closing <div> tags with the "thumbnail_generation_wrapper" class identifier may be considered for use in the thumbnail image. Any number of <div> sections or other content features may be included between the opening and closing thumbnail <div> tags. FIG. 2B illustrates an example result from the page of FIG. 2A where a thumbnail image 230 is created from the header 215.

While relying on publishers to identify content features of the page which are well-suited for thumbnail images may result in overall improved quality of thumbnail images, some publishers may not identify the thumbnail-appropriate section(s) of the page. The present technology may assist in generating intelligent thumbnails even when assistance from the publisher is unavailable.

Figure 3B:
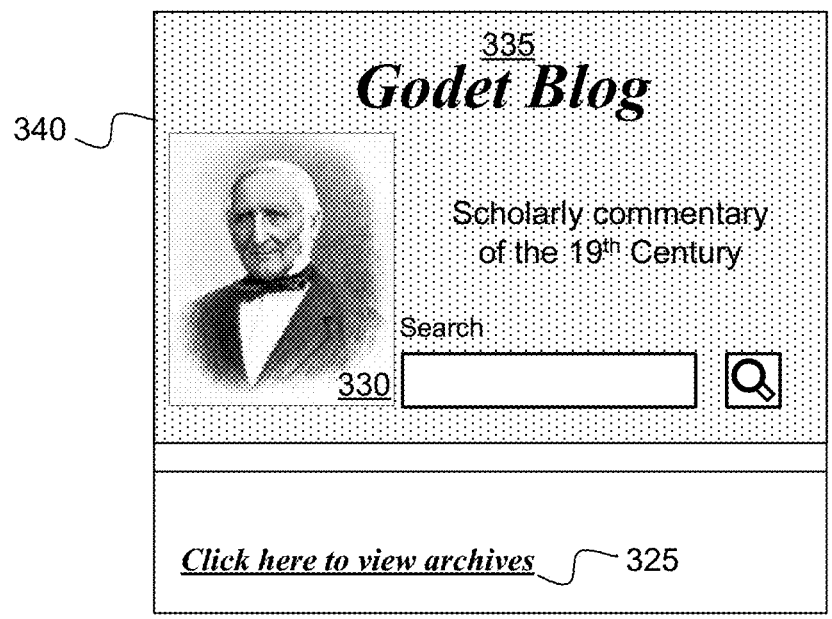

FIGS. 3A-3B illustrate an example approach for removing dynamic content features from the page before generating the thumbnail image. FIG. 3A illustrates an example blog page 310. New blog posts 315 may be presented on the current page 310 with earlier posts available using the link 325 to view archived posts. A majority of the page 310 is content which changes each time a new blog post is added. The page 310 also includes a dynamic advertisement 320 which may change from one page view to the next. Similarly, as described with respect to FIGS. 2A-2B, the page 310 may be constructed of different sections which may be identified, for example, by <div> tags. In this example, because the publisher has not called out the class identifier for identifying thumbnail-relevant content features or sections of the page, an analytics engine may use a processor to analyze the content of the sections identified by the <div> tags to identify the dynamic content and the static content. After identifying the dynamic and static content of the page, content in <div> wrappers that is updated dynamically may be removed or hidden from the page 310.

The present technology does not contemplate modification of the source page, but rather modification of a copy of the page as viewed at the computing device generating the thumbnail image and received from a source server serving the page 310. However, modification of the original page is also contemplated. For example, the original page may be modified and the changes reverted after rasterizing the thumbnail. Where various examples of the technology describe analyzing the electronic page, or identifying features of the electronic page, etc., this electronic page may by a copy of an original, source page. The copy of the source page may be downloaded to or stored locally at a computing device generating the thumbnail image. The copy of the page may be at least a partial copy of the page. For example, back-end, server-side data or processes may be used to create some pages. The present technology may make a copy of the visible result of such data or processes, or may generate a copy of code that provides the same visible result, such that the thumbnail image represents what is visible to a user. A modified page may be created and stored at least temporarily in memory while generating the thumbnail image. The modified page may optionally be a modification of a copy of the electronic page, which in turn may optionally be a copy of the source page. In another example, modifications to the page are contemplated/planned but a modified page is not actually created or stored. Rather, a thumbnail image is rendered directly from the portions of the page identified for use in the thumbnail image. The modified page may be rendered, in whole or in part, before generating or capturing the thumbnail image, which may be based on the rendering of the modified page. This example also does not rely on a user-visible rendering of the page, although such a configuration with user-visible rendering for generating the thumbnail images is also contemplated.

Whether the modifications are actually implemented or simply planned prior to generation of the thumbnail image, removal of the <div> wrappers (i.e., page sections) that are updating the page dynamically may result in an improved thumbnail image. In one example, TimeOut, requestAnimation, and other functions may be used to detect dynamic content, such as the travel advertisement included on the page. Cross-domain origin of data requests in the page may be another consideration in determining whether to include or exclude content features from a thumbnail image. Same-domain data may be considered more relevant for a thumbnail image than cross-domain data and thus may be more likely to be included in the thumbnail image. For example, third-party advertisements may rely on data from a third-party domain. The searchengine.com page 125 of FIG. 1A may provide advertisements. An advertisement for a page or service at searchengine.com may not be a cross-domain advertisement or result in a cross-domain data request, whereas an advertisement for the socialsharing.com page 210 of FIG. 2A may be a cross-domain advertisement or result in a cross-domain data request relying on data from socialsharing.com or relying on data from an advertiser at another domain advertising for socialsharing.com. Thus, the data from an advertiser at another domain is less likely to be included in the thumbnail image.

In another example, some pages may simply include a large amount of text that is static. Checking for dynamic content may not exclude such text content features from being included in the thumbnail image, yet the inclusion may result in a less useful thumbnail image. Thus, page section wrappers that include more than a predetermined amount of text may be removed from the modified page or at least diminished in focus, such as through reduction in size, alteration in placement, blurring of the text, etc. Whether the text section is lengthy or not may be determined in any number of ways, such as according to the character or word count, based on the percentage height of the total page height occupied by the text, etc.

Depending on the configuration of the page, simply removing the dynamic content, advertisements, long text sections and the like may result in large blank spaces. Some pages include section wrappers specifically to add blank space to a page, such as to separate sections of the page, to space and organize content features, etc. The present technology may remove section wrappers or page sections that add blank spaces to a page to further modify the modified page for generating the thumbnail image. In one example, thresholding may be a suitable feature extraction method for identifying blank spaces to remove. In thresholding, an assumption may be made that a content feature is defined by brightness and thresholding an image at that brightness level will find the feature. Content features with a visual threshold that is separate from a background may not be considered blank space. Other known processes may also be applied in determining whether a portion of the page is truly a blank space, such as intensity normalization, subtraction, Fourier transforms for template matching, etc., as may be appreciated. If not removed, blank spaces may hinder identification of a page from the thumbnail image. A goal may be to remove unrecognizable content features of the page for the modified page such that the remaining content features in the modified page are more distinguishing and identifiable.

While some section wrappers that simply add a space to a page may be removed, some wrappers may add one or more colors to the page that serve to distinguish the page. For example, a website may use a single brand to identify the website. The brand may be associated with a color used as a portion of the page. For example, the color may be a page background color, a page body color, etc. The inclusion of such colors in the resulting thumbnail image may further assist a user in distinguishing one page from another. The page 310 in FIG. 3A includes a background color at the header section 350 of the page which may be useful in identifying the page from a thumbnail image. In one example, representative colors may be identified from the prevalence of colors on the page and the percentage of the page including the color. In another example, the identification of the potential colors to include in the thumbnail image may be after the elimination of dynamic content and the like.

Photographs or other images may be useful visual cues for identifying a page. The page in FIG. 3A includes an image 330 of the blog author which may be recognizable by a user from a thumbnail image and thus may be useful to include in the thumbnail image.

Searching the page for dynamic content, text, blank spaces, colors, images, etc. may be a filtering process. In other words, the page content features may be filtered and some content features may be removed while other content features are preserved in the modified page. What remains of the page after filtering may be used to generate the thumbnail image. For example, a screenshot of the area that has a maximum portion of content may be captured. The image capture position may give preference to a static section or image which is determined to be branding of that page. This determination may be made by comparing the page against other pages at the site. For example, if the archived posts link is selected and the archived posts also include some same content features as the page of FIG. 3A, these content features may be identified as branding.

FIG. 3B illustrates an example thumbnail image 340 resulting from the processes described with respect to the page of FIG. 3A. In FIG. 3B, a long text section 315 has been identified and removed. The long text section 315 may be dynamic content. The travel advertisement 320 which is dynamic content has also been removed. Blank spaces in the page have been reduced or eliminated to position content features more compactly. Static portions 325 330, 335, 350 of the page 310 have been preserved. The colored background in the header section 350 has been preserved. A static image and branding of the page 310 has been preserved. The result is a much more identifiable thumbnail image 340 representing the blog page 310 than if an image were made of the original page 310 without modification.

Figure 3C:
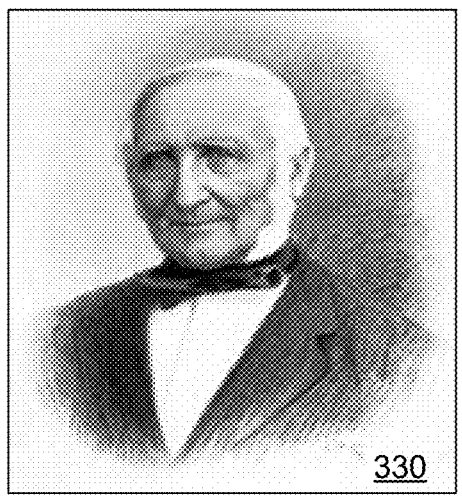
Figure 3D:

FIGS. 3C-3D illustrate still further simplifications of the blog page 310 for the thumbnail image. As mentioned, images may be considered more visually representative of a page than text, at least if the image is static, and particularly if the image persists across multiple pages on a site. If an image is prominently displayed across multiple pages of a site, the image may be considered representative of the page, or even the site as a whole. Thus, optionally, the image 330 alone may be selected for generating the thumbnail image as shown in FIG. 3C. Alternatively, FIG. 3D illustrates a determination that certain prominent text 335 and coloring from the page of FIG. 3A is best representative of the page for the thumbnail image. Optionally with some simple text wrapping, a thumbnail image with a recognizable color and large readable text may be generated.

Figure 4A:
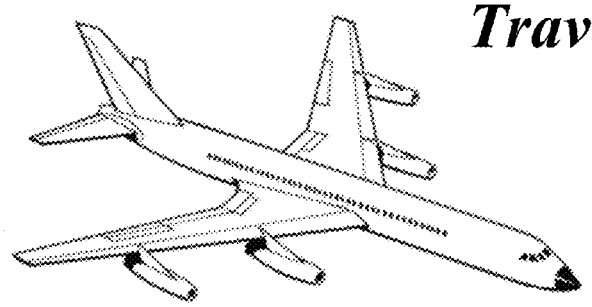
FIGS. 4A-4B illustrate a page from which features may be extracted for generating a thumbnail image in accordance with an example of the present technology.
Figure 4A:
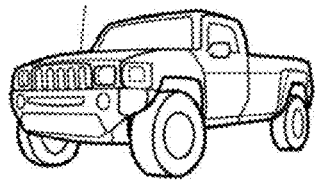
Figure 4A:
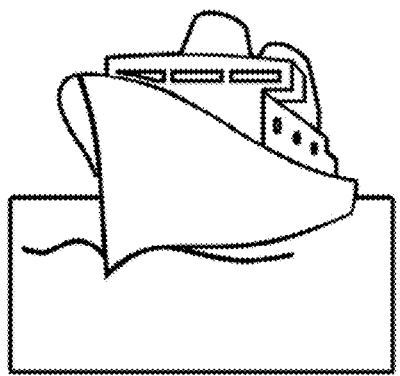
Figure 4A:
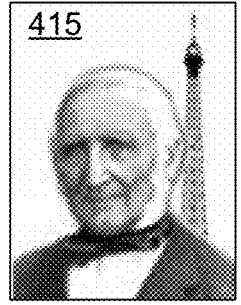
Figure 4B:
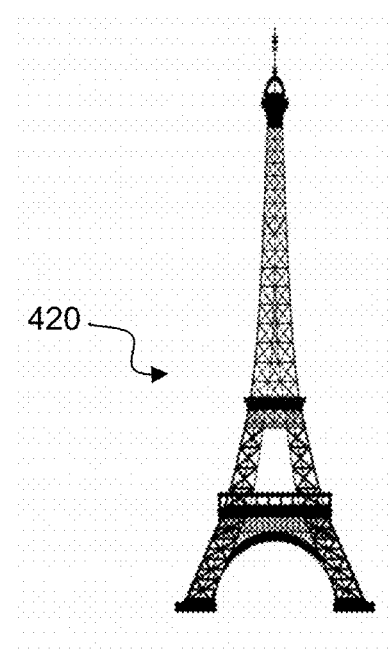

Reference will now be made to FIGS. 4A-4B to describe additional example implementations of the present technology specifically relating to feature detection. Various algorithms exist to extract features from a given image. The present technology may apply similar algorithms to detect various types of content features depending on the type or classification of a website. For example, for a travel website, a method may include detecting whether any of the content features of a page 410 include outdoor photographs 415 or the like using a detection algorithm such as edge detection. Any number of other algorithms individually or in combination are also contemplated. For example, a method may use template matching where a small portion of an image is used to match to template. This match may then be used to replace an image with a better image, such as a larger image, an image with higher resolution, an image with a better composition, etc. For example, a small Space Needle image may be used to identify that the image is about the city Seattle, Wash., U.S.A. From cache memory, a browser may substitute a Seattle image with the existing Space Needle image to enhance cognitive recognition of the location by the user. In FIG. 4A, a photograph 415 is included of an individual in front of the Eiffel Tower. The photograph 415 is small and blurry. The individual in the photograph 415 is a tourist that may not be easily recognized by visitors to the travel site. However, the Eiffel Tower may be well recognized. An image recognition algorithm may analyze the photograph 415 and recognize the Eiffel Tower from the image. A search for a replacement image which better depicts the Eiffel Tower for use in a thumbnail image may be performed and the replacement image may be substituted for the original image in the modified page. FIG. 4B illustrates a larger, higher resolution image 420 of the Eiffel Tower which may be substituted for the photograph 415 in FIG. 4A when generating the thumbnail image. Optionally the image 420 of FIG. 4B may be used as the thumbnail image as has been described previously. However, the image 420 of FIG. 4B may also be used in combination with other content features of the page 410 in FIG. 4A to generate a thumbnail image which well-represents the page 410.

Other image processing algorithms may also be used to extract features from images. For example, photographs may be analyzed with facial recognition algorithms. The facial recognition algorithms may be used to identify faces in images, and optionally where the data is available, to recognize the identity of the faces. Where faces are identified in one or more images on a page and the image is determined to be representative of the content focus of the page, the image may form a focus of the thumbnail image composition rather than simply being included as a shared or secondary point of focus of the thumbnail image. For example, the image in the pages of FIG. 2A or 3A may be used to create the thumbnail image as in FIG. 3C or in an arrangement of the content features of FIG. 3B but with the image larger and more centrally positioned.

A (potentially very large) data structure may hold the original content of the electronic page. When preparing a thumbnail image to be drawn, a "virtual page" that corresponds to the thumbnail-in-preparation may include or refer to or map to verbatim content features from the original page content and/or may include or refer to or map to modified content features that are either based on original page data (altered partial copies) or are completely artificial or new, such as where actual text is replaced with a "lorem ipsum" texture representing text that would have been illegible in the thumbnail image. The references to original content may be implemented by using "holder" or "wrapper" text nodes in code for the page.

Figure 5:
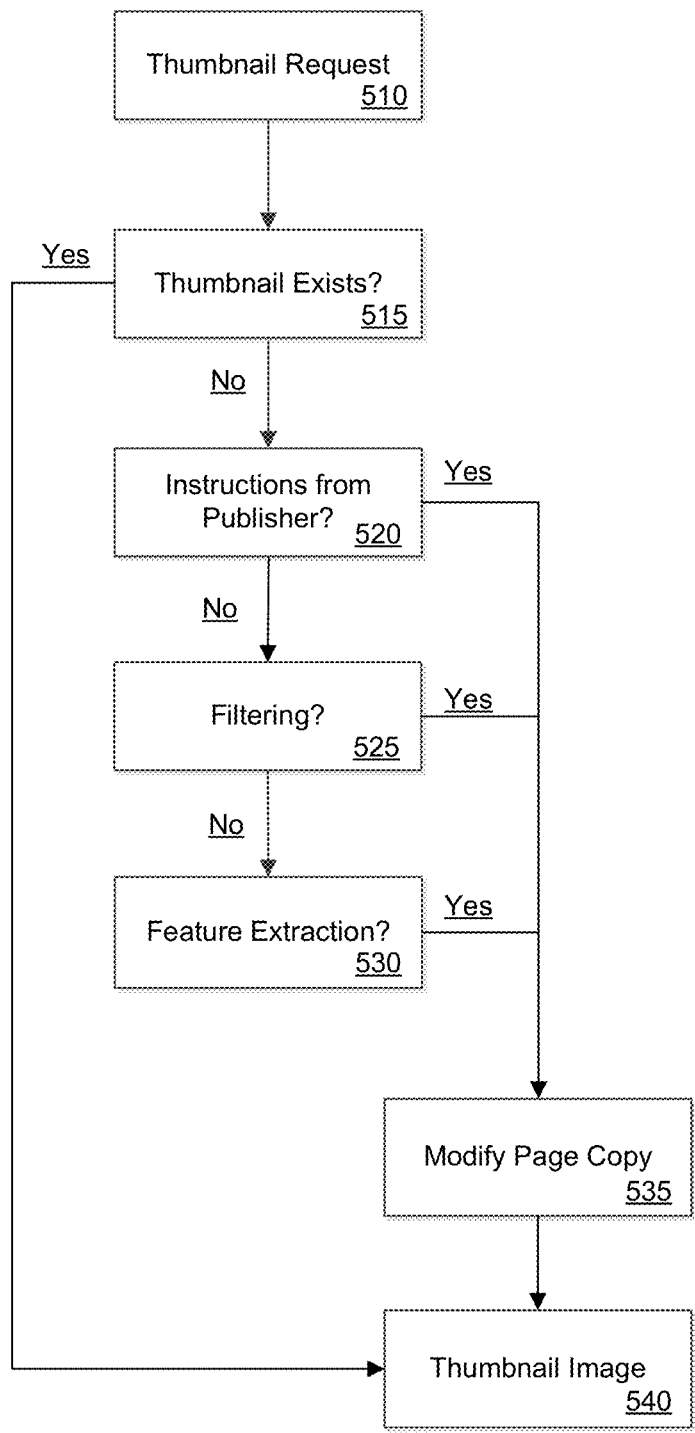
FIG. 5 is a flow chart illustrating a process and decisions for generating a thumbnail image in accordance with an example of the present technology.

FIG. 5 illustrates an example flow diagram of a process for generating a thumbnail image 540. The flow diagram enables a determination of whether intelligent thumbnail related features are present and/or whether to diminish or increase a focus on identified content features. The change in focus may extend to omitting content features from a modified page to including only a specific content feature in the modified page. The change in focus may further include changing a size or positioning of a content feature, changing a literal focus of the feature, such as by increasing blur or sharpness of the feature, etc.

At a start of the flow, a request for a thumbnail image may be received at 510. The request may be received from a multiple data source application. A determination may be made at 515 as to whether a thumbnail for the page already exists. For example, a page may have recently been visited on the computing device and a thumbnail image generated. If the page is visited again, a thumbnail image may already exist and the processing to generate the thumbnail image may not be performed again. In another example, a multiple data source application may be in communication with a thumbnail server that generates thumbnails in response to requests for thumbnails or which stores thumbnails generated by multiple data source applications. Even if a multiple data source application on a particular device has not previously visited a page and/or generated a thumbnail image for the page, another multiple data source application on a different device may have visited the page and a thumbnail may be available at the thumbnail server for retrieval. Thus, when the request is received at 510 and a determination is made at 515 that the thumbnail image already exists, the thumbnail image 540 may be used for the intended purpose (e.g., recent history, hyperlinks, shortcuts, bookmarks, etc.).

If a thumbnail does not exist at 515, the process may check at 520 whether instructions from the publisher are present for generating a thumbnail image. The instructions may be configured to be compliant with the multiple data source application requesting the thumbnail. If the page includes instructions but the instructions are not compliant, the page may be processed as if the instructions were not present. Example instructions may identify a container or wrapper such that content within the wrapper is to be included in the thumbnail image. For example, the container may include an identifier identifying the container as being thumbnail-relevant. In some examples, the wrapped content may simply be centered within the area captured for the thumbnail. In another example, the thumbnail may originate from a specific portion of the wrapped content, such as a top left corner of the wrapped content. In one example, instructions may specify page (X, Y) coordinates at which to begin the thumbnail and a number of horizontal and vertical pixels from the coordinates to include in the thumbnail.

In some examples, instructions from the publisher may not be explicit. For example, a page may identify various sections of a page, such as header, body, footer, menu, logo, sidebar, etc. In the absence of explicit guidelines, the process may use general or generic guidelines to generate a thumbnail image including or centered on one or more of such identified page sections.

In one example, a publisher may provide metatags and may enable specific views of the content of a page. For example, the publisher may enable a reading view of a page which identifies some of the content features to the exclusion of others to simplify a view of the page for reading purposes. However, for generating a thumbnail, text and dynamic content may be less desirable, as has been discussed. Thus, where the publisher does not provide specific thumbnail guidelines, but does provide instructions for rendering a reading view or other specific content view, a multiple data source application may be configured to create a different view which is the opposite of that specified by the publisher. In other words, the content features focused on in the view provided by the publisher may be excluded for generating the thumbnail while those content features excluded in the view provided by the publisher may be included when generating the thumbnail.

To assist publishers in defining the thumbnail relevant content features of the page, the multiple data source application or documentation for the multiple data source application may provide recommendations, strategies, guidelines etc. that may be followed to ensure that a thumbnail image may be generated in accordance with publisher expectations. The multiple data source application may be configured to adhere to the guidelines to produce a predictable result. When a publisher provides instructions which do not meet the expectation, the instructions may be disregarded and the process may continue by filtering the page at 525 to intelligently determine a focus of the thumbnail image. Likewise, in the absence of instructions, the process may continue to filtering at 525.

At 525, filtering of the page may be performed to remove undesired or less-relevant content features from a modified page copy at 535, or at least to diminish the focus or importance of the less-relevant content features. These less-relevant content features may be those which do not significantly contribute to the usefulness of the thumbnail image in visually identifying the page associated with the thumbnail image. These less-relevant content features may cause confusion with the user. The filtering process 525 may optionally include assigning a score to each of the content features of the page. A scale of the scoring may be adapted as desired, but in one example, content features may be rated on a scale of 0-100, with 100 indicating highly thumbnail-relevant and 0 indicating highly likely to be irrelevant or non-useful to the thumbnail image. For example, static content may receive a higher rating than dynamic content. Wrappers with content features that are updated dynamically may be removed from consideration for the modified page. A user generally is not expected to be able to remember dynamic content on a page to facilitate future visits to the page.

Webpages will sometimes use timeouts to update elements or include animations or the like. Changing, moving, expiring content features may be detected and removed from the modified page copy at 535. Additionally, content features which do not add significantly to the identity of the page may be assigned a low score. For example, white spaces may be given a low score. As another example, sections with large amounts of text, such as more than 20 words, or more than 50 words, etc. may be scored low. These low scoring sections may be diminished in view or completely omitted from the modified page. In one example, despite removing various content features from the page for the modified page, the process may attempt to substantially maintain a layout of the page. Intentionally added color spaces may be scored higher than blank or white spaces, at least depending on how often the color space is used, the size of the color space, etc.

Any of a variety of scoring methods may be used to score the content features of a page. An example of relative scoring is described above. As another example, content features of the page may be given a pass/fail score to determine whether the content features remain in the page, such as by giving dynamic content features a fail score and static content features a pass score. In another example, a graded or scaled scoring system may be used. Types of content features may be given a base score which may be increased or decreased depending on characteristics of the content feature. For example, a minimum score of a content feature for inclusion in the thumbnail image may be 50 out of 100. Text may have a default base score of 30. However, if the specific text is very short, the score may increase. If the specific text is static, the score may increase. If the specific text is larger than other text on the screen, the score may increase. If the color of the specific text is different than the color of other text on the page, the score may increase. For example, if the text is a large headline or title of the page, the size is typically larger (+10 score), the length of the text is typically short (+10 score), sometimes the color is different (+10 score), etc., and thus the text may have a score increased by each of these factors to greater than 50, in this example to a score of 60. An image may have a base score of 70. However, size, resolution, and other characteristics of the image may result in an increase or decrease of the score. Larger, higher-resolution images may have the score increased, while smaller, lower-resolution images may have the score decreased. Images that are prominently placed on the page may be have a score increase, while images that are less prominently placed may have a score decrease. When a content of the image is ascertainable such as from image metadata, image title, image alternate text, image recognition processing, etc., and the content of the image matches or strongly correlates with text or metadata of the page, the score of the image may be increased. When the content of the image does not match or correlate well with the text or metadata of the page, the score of the image may be decreased.

Scored content features may be ranked. In a true/false type scoring regime, the 'true' scoring content features, being those which are useful for thumbnail images (e.g., static content, images, etc.) may be ranked together and the 'false' scoring content features may be ranked together. In a relative scoring regime, the content features may be ordered according to a relative score (e.g., static content ahead of dynamic content, images ahead of text, etc.). In a graded scoring regime, the score number assigned to each content feature may be used to sort the content features from highest to lowest. For any scoring regime, a cutoff may be implemented to determine which features to not include in the thumbnail image. As another example, the highest ranking content feature from whichever scoring regime is used may be selected for use in the thumbnail image. The thumbnail image may then be scored as is described later. The next highest ranking content feature may then be added to the thumbnail image and the thumbnail image may be re-scored. If the score improves, the addition is kept, but if the score decreases the addition is discarded. The process may be repeated for additional high ranking content features. The process may stop when all of the content features that are suitable for the thumbnail image are included in the image, or when the addition of another content feature to the thumbnail image results in a decreased score, or when the overall thumbnail image is scored above a defined threshold.

Scoring of the thumbnail image may be based on various characteristics of the thumbnail image, which definition of desired characteristics may vary between specific applications. As an example, however, a high scoring thumbnail image may include at least one representative image, a small portion of text that is recognizable in the thumbnail image, and/or one or more colors representing the content or branding of the page. Two out of three of an image, text or color may be sufficient in some examples for the thumbnail image. In another example, the text, image, colors, etc. may be scored similarly as described with respect to scoring of content features of the page above where the specific characteristics may result in an increased or decreased score. A minimum threshold score may be predefined for determining whether a thumbnail image is acceptable. If combination of the high ranked content features cannot result in a score meeting or exceeding the threshold, then the thumbnail image may be generated based on the highest scoring combination of content features.

For each content feature remaining in the modified page, the size of these content features may be enlarged, effectively 'zooming in' on the remaining features for further emphasis in the thumbnail image. In one example, after scoring and ranking the content features of the page, various test modifications may be made. For example, a 20 pixel border may be removed from the periphery of the page or the modified page. If no high-scoring content features are removed through the removal of the border, then the removal may be considered acceptable. Additional iterative test modifications may be made to further remove other portions of the page and evaluate the effect on the score. Other modifications may also be made or tested. For example, if a resulting thumbnail includes a small icon and text (where 'small' may be determined according to a pre-defined standard), the text may be eliminated and the icon enlarged. As another example, existing content features may be substituted with something that is easier to recognize by the user, such as larger text, a different image, etc., such as has been described with respect to FIGS. 4A-4B.

Pages may include a logo or other identifying feature. In one example, a logo may be recognized by the inclusion of "logo" in the image filename or metadata, or by the inclusion of one or more words from the internet address or page metadata in the image filename or metadata. Also, when determining whether a content feature is likely a logo or other branding feature, linked pages linked from the page for the thumbnail may be retrieved and analyzed to determine which content features are consistent across pages. The content features which are consistent across pages may be assigned a high score as being representative of the page. Example branding features include images, text, coloring, organization, etc.

In one example, a user may wish to bookmark multiple deep links, such as product pages on an electronic retail site. If the content features that are consistent across pages were emphasized for each of the bookmarks, the bookmarks may appear substantially the same and provide minimal useful differentiation for the user. To address this, distinctions may be intentionally made between thumbnails for a same site. A logo or branding of the electronic retailer may be reduced in score compared to a score if only a single bookmark were created. For example, a logo may be reduced in size but still provided on the thumbnail image for each of the pages, where different products may be emphasized in the thumbnail images for the respective pages. In an example where differentiation is more challenging due to significant similarity between the pages, in one thumbnail image a logo may be enlarged and text reduced in size while in the other thumbnail image the logo may be reduced in size while the text is enlarged. This may facilitate a visual distinction between the thumbnail images. Such changes may be made for any number of desired thumbnails for pages on a site where the focus on features or portions of the page changes from one thumbnail to another to give each thumbnail a unique identity or appearance. Thus, where a scoring paradigm is used to score content features of a page, the paradigm may be shifted to provide an altered scoring paradigm when multiple bookmarks for a same site are requested, at least when the underlying pages exhibit greater than a threshold similarity (e.g., greater than 50% similar, greater than 75% similar, etc.).

To further facilitate the generation of distinguishing thumbnails for various pages, particularly for multiple different pages of a same site, a thumbnail server may be used to track popular pages visited by users. The multiple data source application may be in communication with the thumbnail server to provide the tracking data. When requesting a thumbnail image, the multiple data source application may send a request to the server for any specific instructions relating to the generation of the thumbnail image. For example, the thumbnail server may instruct that on a home page of a website, the logo or other branding content features are to be emphasized. However, for other pages at the website, common content features are to be excluded or diminished while other static content on the page is emphasized. The thumbnail server may optionally track and analyze the thumbnail images generated by multiple data source applications in communication with the thumbnail server.

Continuing reference to FIG. 5, if filtering is not performed at 525, the process may proceed to feature extraction at 530. The feature extraction process 530 may involve the use of one or more image processing algorithms to extract features from one or more images in the page. Optionally the images may be scored prior to feature extraction to reduce the feature extraction load since low scoring images may be avoided. The feature extraction algorithm may use data about the website, page, content type, etc. from metadata, search data or the like. For example, a social media page is likely to include faces and may benefit from face detection processing. A travel page may likely include outdoor pictures and may benefit from location extraction processing. In other words, processing actions may be taken based on a derived context of the images.

When generating a thumbnail image at 540, such as when capturing a screenshot, for example, image processing may be used to identify portions of the page that make the most sense for inclusion in a thumbnail image. On a travel page, outdoor photographs may be more recognizable than people photographs. On a social page, the people photographs may be more recognizable than outdoor photographs. Features identified in images may be compared against a features database to identify a subject of the image. In other words, the processing may determine what the image 'looks' like to identify the subject. For example, text may be recognized from an image to identify a subject of the image. As another example, if the Space Needle is identified in an image, the image may be determined to represent Seattle, Wash. Data mining may then be performed to determine for the thumbnail image purposes whether the image has a sufficiently high resolution or is large enough to create a good thumbnail. Otherwise, the image may be substituted with a more useful image of Seattle to assist the user in recognizing the page relates to Seattle. More useful images may be obtained using a search engine, searching using keywords or tags derived from the image recognition or from metadata in the page or image. On a social page where facial recognition is used to identify photographs of people, a final thumbnail image may focus on an area of the page with people. For example, if the page is a family blog, the thumbnail image may include a family photo or be a family photo.

While the diagram of FIG. 5 illustrates a binary decision at 520, 525, 530, etc. for modifying the page or continuing processing, an actual implementation may be more nuanced. For example, a publisher may include instructions for generating the thumbnail image, but may also wish for additional processing to be performed. For example, the publisher may identify a section of a page including multiple content features but may not specify which of the content features to exclude, preferring instead for the filtering operation at 525 to be applied to exclude one or more of the content features from the resulting thumbnail image. The publisher may specify that additional processing is desired or allowed in addition to that according to the provided instructions. In another example, a publisher may not specifically desire or request for additional processing, but the multiple data source application may be configured to provide the additional processing after any specific instructions anyway to further refine and optimize a resulting thumbnail image. In another example, the publisher instructions 520 may overlap or substantially coincide with filtering 525 or feature extraction 530 operations. While the publisher instructions 520, filtering 525, and feature extraction 530 operations are illustrated linearly in the drawing, these operations may be performed in any order and/or in any desired combination. The thumbnail image generation processes in some examples may be strictly code based (e.g., based on the underlying HTML, javascript or other code) or may be strictly visually based (analyze the visual appearance of the page without regard to the code) or may be based on a combination of code and visual bases.

The present technology may utilize a client/server or virtualized network architecture that involves client computers connecting to a server and optionally with other client computers. Such a configuration may facilitate exchange of tracking, analysis or other thumbnail generation-related data. An example of the client/server architecture or virtualized network of the present technology provides a central data center having at least one server provided therein. The present technology may be provided using a service provider environment. For example, the service provider environment may provide one or more services to host or exchange the thumbnail-related data collected, transmitted or created by the one or more multiple data source applications in communication with a server in the service provider environment.

Figure 6:
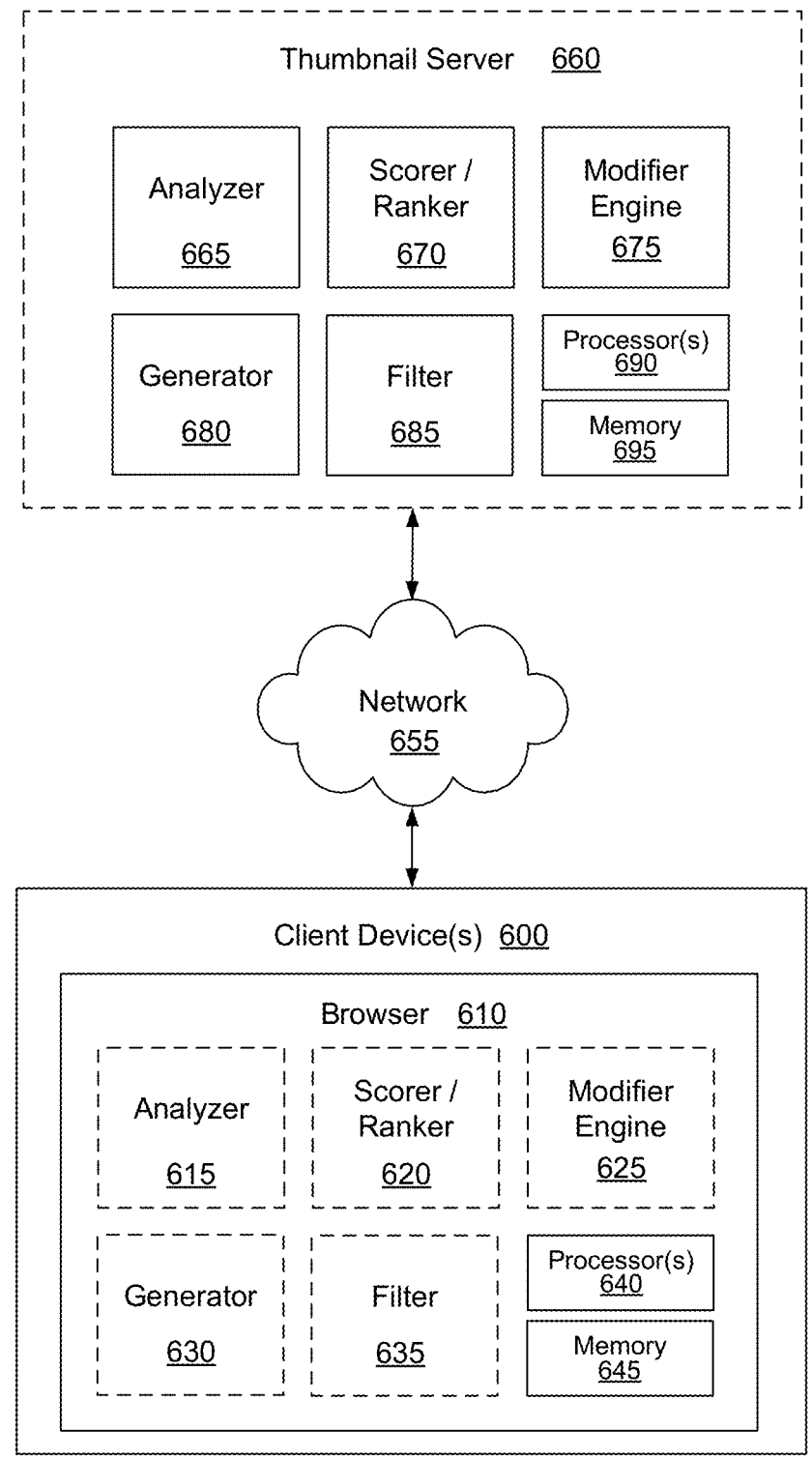
FIG. 6 is a block diagram of a system for generating thumbnail images in accordance with an example of the present technology.

Referring now to FIG. 6, a block diagram of a system for generating thumbnail images is illustrated in accordance with an example of the present technology. The system elements may be implemented using one or more computing devices, optionally including one or more computing devices in a service provider environment, such as a thumbnail server 660 as an example computing device, as well as one or more client devices 600 which may be external to the service provider environment, and may be connected across a network 655.

The system may include a number of modules or services 615-625 and/or 665-685 as part of a thumbnail generation system. Client device 600 may represent a plurality of client devices having a browser 610 or multiple data source application. Features of FIG. 6 are drawn with dashed lines to illustrate that the features may or may not be present. For example, the present technology may be implemented at the browser 610 on the client device 600 in the absence of a thumbnail server 660. The functionality provided by the present technology may be enabled through the browser 610. As another example, at least a part of the functionality of the present technology may be provided remotely from the browser at the thumbnail server 660 which may be in communication with the client device 600 over the network 655. The following discussion focuses on the presence of the functionality at the client device 600 rather than the server 660, but it is to be understood that some or all of the functionality may be server-side rather than client-side. While not specifically called out, 665-695 of thumbnail server 660 may perform essentially the same as described with respect to 615-645 of browser 610. Additionally, there may be features of the present technology that have been described with respect to other drawings or examples than those shown and described with respect to FIG. 6, but these features and functionality are also able to be implemented using the system of FIG. 6.

The browser 610 may include an analyzer 615. The analyzer may be configured to analyze an electronic page to identify content features of the electronic page. For example, the analyzer may identify text, images, shapes, colors, metadata, section divisions, etc. in the page. A scorer/ranker 620 may be configured to assign scores to the content features of the electronic page. The scores may indicate a suitability of the various content features for inclusion in the thumbnail, and more specifically for prominence in the thumbnail image. The scorer/ranker 620 may be further configured to assign a ranking to the content features based on the assigned scores.

A modifier engine 625 may be configured to determine modifications to the electronic page which would create a modified electronic page. The modifications are selected to emphasize thumbnail-relevant content features and de-emphasize or diminish less-relevant content features. The emphasis and de-emphasis of the content features may be based on the ranking of the content features assigned by the scorer/ranker 620. A filter 635 may also be used to filter and eliminate or de-emphasis the less-relevant content features. For example, the filter 635 may reduce dynamic content, reduce white space, resize content features, or substitute content features with other content, or at least identify such changes to be made by the modifier engine 625. The browser 610 may include a generator 630 for generating the thumbnail image for the electronic page. The thumbnail image may be generated using at least a portion of the modified electronic page.

When the electronic page includes instructions from a publisher for modifying the electronic page, these instructions may be recognized by the analyzer 615 to be implemented by the modifier engine 625 and generator 630. The instructions may identify a portion of the electronic page for use in generating the thumbnail image. In one example, the filter 635 may further filter the portion of the electronic page identified in the instructions to further refine the thumbnail image result generated by the generator 630.

Client devices 600 may be available to access and interact with the thumbnail server 660 in a computing service provider environment or one or more computing instances or clusters, over a network 655. Example client devices 600 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The service provider environment may be implemented across one or more computing device(s) connected via a network 655. For example, a computing device may include a data store and various engines and/or modules such as those described above and such modules may be executable by a processor 640 or 690 of the computing device. The system may be implemented as a plurality of computing nodes or computing instances, each of which comprises at least one processor 640, 690 and a memory 645, 695, where the computing nodes are configured to collectively implement the modules, data stores and so forth.

The modules that have been described may be stored on, accessed by, accessed through, or executed by a computing device. The computing device may comprise, for example, one or more processors 640 and one or more memory modules 645. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device 600 shown in FIG. 6 may be representative of a plurality of client devices 600 that may be coupled to the network 655. The client device(s) 600 may communicate with the computing device over any appropriate network, including an intranet, the Internet, a cellular network, a local area network (LAN), a wide area network (WAN), a wireless data network or a similar network or combination of networks. In one example, the network 655 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 7:
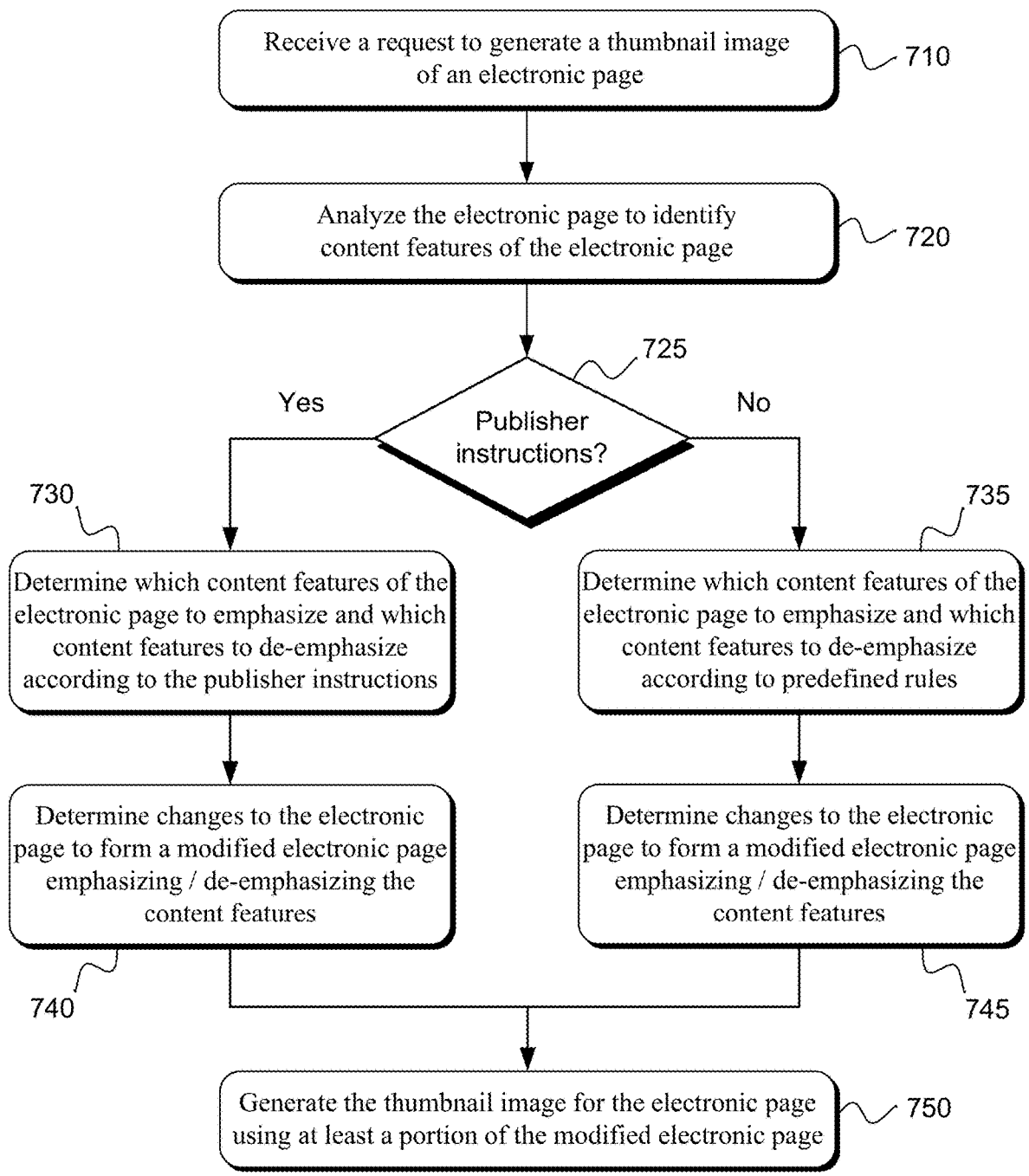
FIGS. 7-8 are flow diagrams for thumbnail image generation methods in accordance with examples of the present technology.
Figure 8:
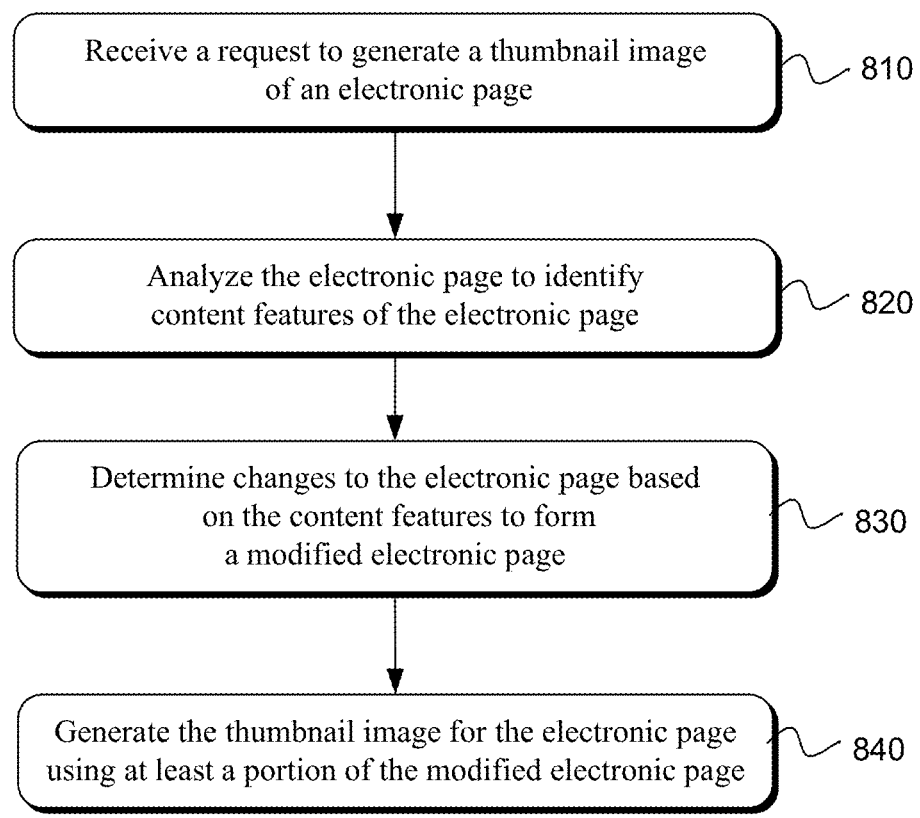

FIGS. 7-8 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 7, a flow diagram of a method is illustrated for a thumbnail generation method. The method may include receiving 710 a request to generate a thumbnail image of an electronic page and analyzing 720 the electronic page to identify content features of the electronic page. In one example, this may include determining whether the electronic page includes instructions for generating the thumbnail images. The instructions may be publisher instructions. The determination may be made at 725 in FIG. 7. The method may further include determining 730 which thumbnail-relevant content features of the electronic page to emphasize and which less-relevant content features of the electronic page to de-emphasize based on the publisher instructions. This may include determining which content features of the page to include in the thumbnail image and which to exclude. This may include determining whether to reposition one or more of the content features. This may include determining whether to resize one or more of the content features. A determination 740 may be made of how to modify a copy of the electronic page as a modified electronic page which emphasizes the thumbnail-relevant content features and de-emphasizes the less-relevant content features using the publisher instructions. In an example where the page does not include publisher instructions at 725, the method may proceed to determining 735 which thumbnail-relevant content features of the electronic page to emphasize and which less-relevant content features of the electronic page to de-emphasize based on predefined rules. A determination 745 may be made of how to modify the electronic page as a modified electronic page which emphasizes the thumbnail-relevant content features and de-emphasizes the less-relevant content features using the predefined rules.

The thumbnail image for the electronic page may be generated 750 using at least a portion of the modified electronic page. The modified electronic page may or may not actually be created or saved. If the electronic page is saved, the save may optionally be permanent or non-transitory, but in many instances the same will be a temporary, transitory save while the thumbnail image is generated.

In one example, the thumbnail relevant features of the electronic page are identified within HTML (Hyper Text Markup Language) or script of the page. The thumbnail-relevant features may have been identified by a publisher of the electronic page. For example, the thumbnail relevant features may be identified using <div> tags with modifiers, such as <div class="thumbnail">, for example. Sections of the page with the appropriate <div> tag may be included in the thumbnail and sections of the page without the <div> tag may be excluded from the thumbnail. In other words, de-emphasizing the less-relevant content features may mean omitting the less-relevant content features from the modified electronic page. In another example, one or more of the less-relevant content features (i.e., the features that are not within the thumbnail-relevant <div> tags) may be diminished in some way rather than excluded or omitted. For example, such features may be reduced in size, moved to less prominent positions, etc.

In some examples, the publisher of the electronic page may not include the code or other identifiers of the thumbnail-relevant features and a processor may instead make the determination of what to include in the thumbnail and what to exclude. The thumbnail-relevant content features may be static page content and the less-relevant content features may be dynamic page content. Because dynamic content is dynamic and changing, a thumbnail of dynamic content may not accurately represent the appearance of the electronic page for subsequent visits to the electronic page. However, the static content is more likely to remain unchanged and may more accurately represent what the user will see upon subsequent visits to the page.

The method may include the processor analysis to determine what to include in the thumbnail and what to omit even when the publisher has identified portions of the electronic page to include. Thus, the thumbnail image may be based on the identifications by the publisher but may be different from the publisher identifications. For example, the publisher may identify content features to include in the thumbnail image and the method may further reduce the content features to include in the thumbnail image or to replace one or more content features with more representative content features.

The method may include identifying the thumbnail-relevant content features using a tag, text, metadata or other object identifiers or markup. An example of using a tag to identify thumbnail-relevant content features has been described above. Another example of tag use may be with images, such as by code to include an image in the electronic page. The code may similarly include a class inside a tag, such as <img class="thumbnail">. Text may be used to identify thumbnail-relevant content features. For example, text which is much larger in size than other text may be more important and may be more likely to be included in the thumbnail image. Metadata in the electronic page code, in images in the electronic page, or the like may be used to identify thumbnail-relevant content features. For example, metadata may identify key words or phrases which are representative of the electronic page. Metadata of images may indicate the contents of the images, and images may be assumed to visually represent a theme of the electronic page. The image metadata may also be used to find images which may be more representative of the electronic page for a thumbnail image, such as to replace an image in the electronic page with a replacement image more suitable for use in the thumbnail. Some images in larger formats may easily and recognizably depict events, places, people, etc., but when shrunk to thumbnail size may be more challenging to recognize. Thus, an image that better depicts the event, place, person, etc. at thumbnail size may in some cases replace the original image for purposes of the thumbnail. In another example, rather than replacing content, emphasizing the thumbnail-relevant content features may include adding content, such as inserting an image into the modified electronic page representing the tag, text or metadata.

Whatever changes are determined for the modified electronic page, consideration may be given to maintaining branding of the electronic page. For example, logos, coloring, organization of some page elements, etc. may be maintained intact in the modified electronic page so that the branding may be recognizable within the thumbnail image as belonging to the electronic page from which the thumbnail image was generated. In one example, maintaining the branding may include resizing the thumbnail-relevant or less-relevant content features, such as increasing a size of the branding content features which decreasing a size of the non-branding content features.

The method may include displaying the thumbnail image, causing the thumbnail image to be displayed, or providing the thumbnail image for display. For example, a computing device may include a display screen for displaying thumbnail images, graphical user interfaces, text, etc. Where the thumbnail image is generated by a browser for use by the browser to enable a user to view thumbnail images of recently viewed pages, bookmarked pages or the like, the method may include, for example, causing the browser to display the thumbnail image when the bookmarked pages are selected to be displayed. The use of the thumbnail image generation method may enable a user to more readily and easily recognize the page represented by the thumbnail image.

In some examples, this or other methods described herein may be implemented wholly or partially as computer readable program code executed by a processor and the computer readable code may be embodied on a non-transitory computer usable medium.

Referring now to FIG. 8, a flow diagram of a method is illustrated for generating thumbnail images. In this example, the method may include receiving 810 a request to generate a thumbnail image of an electronic page. The electronic page may be analyzed 820 to identify content features of the electronic page. A copy of the electronic page may be modified 830 based on the content features to create a modified electronic page. The thumbnail image for the electronic page may be generated 840 using at least a portion of the modified electronic page.

In one example, the content features of the electronic page comprise instructions in code of the electronic page for modifying the electronic page and generating the thumbnail image. The instructions may be publisher instructions. In one example, at least one of the content features comprises dynamic content and the instructions identify a substitution for the dynamic content, wherein modifying the electronic page comprises creating the modified electronic page with the substitution for the dynamic content. For example, the publisher may specify to replace dynamic content with some specified static content, such as an image, logo, text, or the like.

The method may include actually generating the modified electronic page rather than just planning the modifications and generating the thumbnail from the planned modifications. When the modified electronic page is generated, the modified electronic page may be subsequently discarded after generating the thumbnail image. If a thumbnail image is to be created for the electronic page again, the electronic page may be modified again.

The method may include determining whether to emphasize or de-emphasize one or more of the content features of the electronic page when modifying the electronic page. Analyzing the electronic page may include scoring the content features of the electronic page for usefulness in the thumbnail image. The scores may be useful in determining whether to emphasize or de-emphasize the one or more content features.

In one example, the method may include replacing one of the content features with a replacement feature not present in the electronic page. For example, when replacing an image with a different image that is more suitable for use in the thumbnail, the replacement image may be external, such as located on a remote, third-party server. The replacement may be based on at least one of a tag, metadata, keyword search, optical character recognition, or image recognition analysis of the electronic page. When making a replacement, the replacement feature may be selected to better represent the one of the content features being replaced for the thumbnail image. In one example, the one of the content features comprises a page image and the replacement feature includes a replacement image having a larger size or higher resolution than the page image.

The method may include analyzing other electronic pages linked from the electronic page. By analyzing these linked pages, common content features shared between the pages may be identified. The method may then include modifying the electronic page based on the content features to create a modified electronic page comprises emphasizing the common content features. In one example, generating the thumbnail image may include generating a plurality of thumbnail images for a plurality of related electronic pages (e.g., one image per page), and generating the plurality of thumbnail images with variations for differentiation. In other words, where the pages share common content features and a thumbnail is to be created for multiple of the pages, different features may be emphasized to enhance a visual distinction between the multiple pages.

In one example of the method, the content features include one or more photographs and the electronic page is a social media page. The method may further include identifying the content features comprises using facial recognition to identify faces on the social media page. The method may also include modifying the electronic page based on the content features to create a modified electronic page emphasizing the one or more photographs.

The present technology addresses the technical problem and technical challenge of creating thumbnail images which are representative of pages such that a user may more easily and readily recognize the page from the thumbnail images. While thumbnail images have been used prior to the present technology, the creation of the thumbnail images has been rigidly defined such that pages are often not easily identified from the thumbnail images. A computing device having a processor and memory may play a specific role in the technical thumbnail image generation process by analyzing the pages, following predefined rules for determining changes to make to the pages (where the pre-defined rules are defined by a publisher of the page and/or by the browser application), and creating thumbnail images from the modified pages. Because the thumbnail images are generated to represent the pages in a more dynamic and flexible manner than prior thumbnail images, a user may expend less time and effort finding a desired page from a list of thumbnail images and less processing time and power of the computing device is expended by not retrieving and rendering any number of other pages while the user searches for a desired page from poorly created thumbnail images. Thus, the present technology may improve efficiencies for the user as well as for the computing device generating and displaying the thumbnail images.

Figure 9:
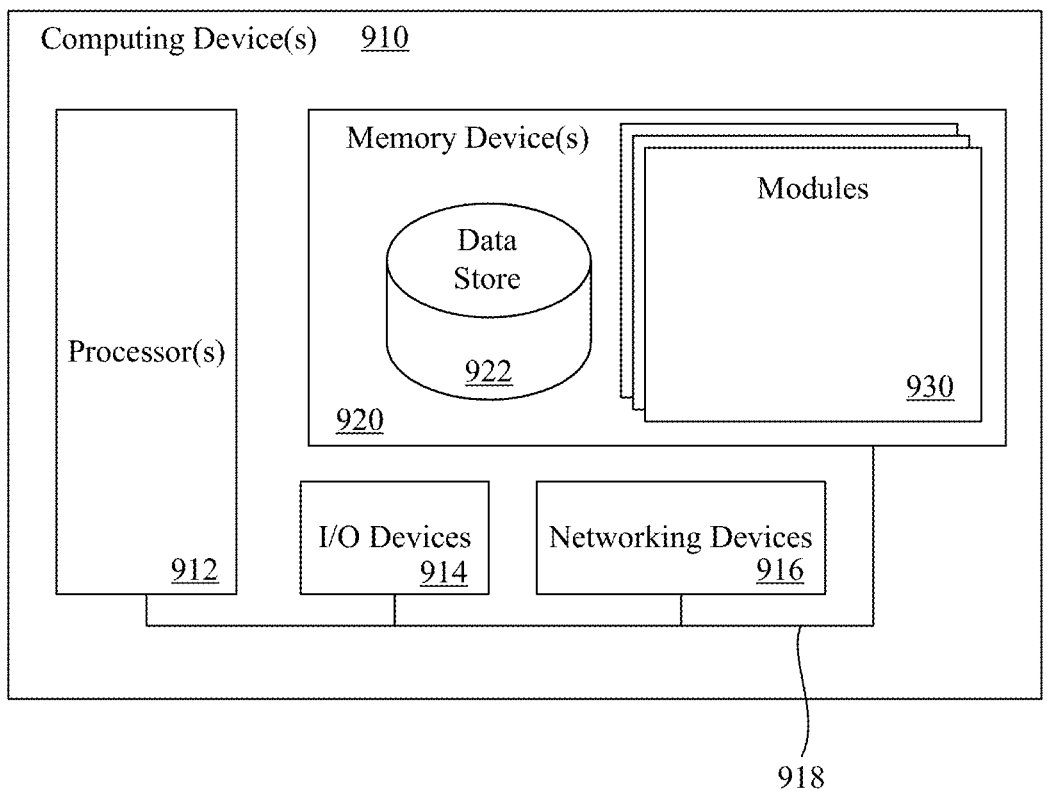
FIG. 9 is a block diagram of a computing system for use in generating thumbnail images in accordance with an example of the present technology.

FIG. 9 illustrates a computing device 910 on which services or modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 930 that are executable by the processor(s) and data for the modules. A data store 922 may also be located in the memory device 920 for storing data related to the modules and other applications along with an operating system that is executable by the processor(s) 912.

The computing device 910 may further include or be in communication with a client device, which may include a display device. The client device may be available for an administrator to use in interfacing with the computing device 910, such as to review operation of a virtual computing instance, make improvements to machine learning models and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method for generating a thumbnail image, comprising:
   receiving a request to generate a thumbnail image of an electronic page;
   analyzing the electronic page to identify content features of the electronic page and a classification for the electronic page from a plurality of page classifications, wherein the classification is associated with one or more processing actions to be performed on at least one of the identified content features of the electronic page, and wherein the content features are identified based in part on tags used by a publisher of the electronic page;
   determining, based in part on the classification for the electronic page, a processing action associated with the identified classification to perform the at least one identified content feature to determine whether the identified content feature is a thumbnail-relevant content feature;
   assigning scores to the identified content features of the electronic page based on feature extraction associated with the determined processing action, filtering of the identified content features, and publisher instructions;
   ranking the content features based on the scores assigned;

identifying first content features of the electronic page and second content features of the electronic page based on the ranking;

determining an appearance of the thumbnail image to be generated based on the ranking;

determining, at least in part by relying on the first content features more than the second content features, a modified electronic page based on the appearance of the thumbnail image to be generated;

determining replacement content by the processing action using the identified content features and modifications related to: size of content features, position of content features, inclusion of the first or second content feature, or exclusion of the first or second content feature, wherein the modified electronic page includes replacement of a first content feature from the identified first content features in the electronic page with the replacement content; and generating the thumbnail image for the electronic page using at least a portion of the modified electronic page having content resulting from relying on the first content features more than the second content features.

2. The method of claim 1, wherein the first content features comprise static page content and the second content features comprise dynamic page content.

3. The method of claim 2, wherein relying on the first content features more than the second content features comprises omitting the second content features from the modified electronic page.

4. The method of claim 1, further comprising identifying the first content features using a tag, text or metadata, and relying on the first content features more than the second content features comprises inserting an image into the modified electronic page representing the tag, text or metadata.

5. The method of claim 1, wherein determining changes to make to modify the electronic page comprises:
identifying branding of the electronic page in response to comparing the electronic page with one or more other electronic pages at a site,
determining changes to make to maintain the branding of the electronic page including a brand logo and a brand color, and
resizing the first or second content features to include the branding in the thumbnail image.

6. A computer-implemented thumbnail image generation method, comprising:
receiving a request to generate a thumbnail image of an electronic page;
analyzing the electronic page to identify content features of the electronic page and a classification for the electronic page from a plurality of page classifications, wherein the classification is associated with one or more processing actions to be performed on at least one of the identified content features of the electronic page, and wherein the content features are identified based in part on tags used by a publisher of the electronic page;
determining, based in part on the classification for the electronic page, a processing action associated with the identified classification to perform on the at least one to take on an identified content feature to determine whether the identified content feature is a thumbnail-relevant content feature, wherein the processing action is associated with the classification for the electronic page;
assigning scores to the identified content features of the electronic page based on the determined processing action;
ranking the content features based on the scores assigned;
determining an appearance of the thumbnail image to be generated based on the ranking;
determining changes to make to the electronic page based on the appearance of the thumbnail image to be generated to form a modified electronic page, wherein at least one of the changes to make to the electronic page includes a change to the identified content feature made based in part on the identified content feature being determined to be a thumbnail-relevant content feature; and
generating the thumbnail image for the electronic page using at least a portion of the modified electronic page.

7. The method of claim 6, wherein the content features of the electronic page comprise instructions in code of the electronic page for modifying the electronic page and generating the thumbnail image.

8. The method of claim 7, wherein at least one of the content features comprises dynamic content and the instructions identify a substitution for the dynamic content, wherein modifying the electronic page comprises creating the modified electronic page with the substitution for the dynamic content.

9. The method of claim 6, further comprising generating the modified electronic page, and discarding the modified electronic page after generating the thumbnail image.

10. The method of claim 6, further comprising determining whether to emphasize or de-emphasize one or more of the content features of the electronic page when modifying the electronic page by modifying a size, position or blur of the content features.

11. The method of claim 6, further comprising identifying other content as a replacement feature based on performing the processing action with at least one of a keyword search, optical character recognition, or image recognition analysis of the identified content feature of the electronic page, wherein the replacement feature is selected to represent the identified content feature in the thumbnail image.

12. The method of claim 11, wherein the identified content feature comprises a page image and the replacement feature comprises a replacement image having a larger size or higher resolution than the page image.

13. The method of claim 6, wherein analyzing the electronic page comprises analyzing other electronic pages linked from the electronic page to identify common content features of the electronic page and the other electronic pages, and determining the changes to make to the electronic page comprises determining changes to emphasize the common content features.

14. The method of claim 6, further comprising:
determining the classification of the electronic page using one or more photographs in a social media page;
performing the processing action using facial recognition to identify faces on the social media page; and
modifying the electronic page based on emphasizing at least one of the one or more photographs having a face on the social media page identified using the facial recognition.

15. The method of claim 6, wherein generating the thumbnail image comprises generating a plurality of thumbnail images for a plurality of related electronic pages, and generating the plurality of thumbnail images each with variations to enable visual differentiation between each of the plurality of thumbnail images.

16. A non-transitory computer-readable medium comprising computer-executable instructions which implement a system to generate a thumbnail image of an electronic page, comprising:
    an analyzer configured to:
        analyze the electronic page to identify content features of the electronic page and a classification associated with one or more processing actions to be performed on at least one of the identified content features of the electronic page, wherein the classification is identified among a plurality of page classifications based upon an analysis of the electronic page, and wherein the content features are identified based in part on tags used by a publisher of the electronic page, and
        determine, based in part on the classification for the electronic page, a processing action associated with the identified classification for an identified content feature to determine whether the identified content feature is a thumbnail-relevant content feature;
    a scorer configured to assign scores to the identified content features of the electronic page based on the determined processing action;
    a ranker to assign a ranking to the content features based on the scores assigned by the scorer;
    a modifier engine configured to:
        determine an appearance of the thumbnail image to be generated based on the ranking, and
        determine changes to make to the electronic page to form a modified electronic page based on the appearance of the thumbnail image to be generated, wherein at least one of the changes to make to the electronic page includes modification of the identified content feature made based in part on the identified content feature being determined to be a thumbnail-relevant content feature; and
    a generator configured to generate the thumbnail image for the electronic page using at least a portion of the modified electronic page.

17. The computing system of claim 16, wherein the electronic page includes instructions for modifying the electronic page, the instructions identifying a portion of the electronic page for use in generating the thumbnail image and used by the modifier engine to modify the electronic page.

18. The computing system of claim 17, further comprising a filter configured to filter the portion of the electronic page identified in the instructions for use with the thumbnail images to reduce dynamic content, reduce white space, resize content features, or substitute content features with other content.

19. The computing system of claim 16, wherein the modifier engine is configured to modify the electronic page by filtering the electronic page to reduce dynamic content, reduce white space, resize content features, or substitute content features with other content.

20. The computing system of claim 19, wherein the modifier engine is configured to modify the electronic page by filtering cross-domain content from the electronic page.

* * * * *